United States Patent
Duan et al.

(10) Patent No.: US 10,994,501 B2
(45) Date of Patent: May 4, 2021

(54) METHOD FOR MOLDING HOLLOW VEHICLE PART, HOLLOW VEHICLE PART AND AUTOMOBILE

(71) Applicants: BEIJING AUTOMOTIVE GROUP CO. LTD, Beijing (CN); BEIJING AUTOMOBILE RESEARCH INSTITUTE CO., LTD., Beijing (CN)

(72) Inventors: Yingtao Duan, Beijing (CN); Fanzhong Kong, Beijing (CN); Na Li, Beijing (CN); Yongbin Shan, Beijing (CN); Wenbo Li, Beijing (CN); Min Jing, Beijing (CN); Xinglong Zhang, Beijing (CN)

(73) Assignees: BEIJING AUTOMOTIVE GROUP CO. LTD.; BEIJING AUTOMOBILE RESEARCH INSTITUTE CO., LTD.

( * ) Notice: Subject to any disclaimer, the term of this patent is extended or adjusted under 35 U.S.C. 154(b) by 123 days.

(21) Appl. No.: 16/477,029

(22) PCT Filed: May 25, 2017

(86) PCT No.: PCT/CN2017/085982
§ 371 (c)(1),
(2) Date: Jul. 10, 2019

(87) PCT Pub. No.: WO2018/129848
PCT Pub. Date: Jul. 19, 2018

(65) Prior Publication Data
US 2019/0337243 A1  Nov. 7, 2019

(30) Foreign Application Priority Data

Jan. 11, 2017 (CN) .......................... 201710020268.5

(51) Int. Cl.
  *B29C 70/34* (2006.01)
  *B29K 101/12* (2006.01)
  *B29L 31/30* (2006.01)

(52) U.S. Cl.
  CPC ........ *B29C 70/342* (2013.01); *B29K 2101/12* (2013.01); *B29L 2031/30* (2013.01)

(58) Field of Classification Search
  CPC .............. B29C 70/342; B29K 2101/12; B29L 2031/30
  See application file for complete search history.

(56) References Cited

U.S. PATENT DOCUMENTS

| 2008/0213490 | A1* | 9/2008 | Strange | C08K 3/22 427/386 |
| 2010/0212816 | A1* | 8/2010 | Schreckenberg | B29C 33/52 156/187 |
| 2017/0066161 | A1* | 3/2017 | Lemko | B29C 33/40 |

FOREIGN PATENT DOCUMENTS

| CN | 1389341 A | 1/2003 |
| CN | 103485570 A | 1/2014 |

(Continued)

*Primary Examiner* — Jeffry H Aftergut
(74) *Attorney, Agent, or Firm* — Dilworth IP, LLC

(57) ABSTRACT

A method for molding a hollow vehicle part, the hollow vehicle part and an automobile. The method includes: a. preparing an inflatable core mold matching a target vehicle part on a geometrical shape in an inflated state, coating curable thermoplastic resin on the surface of the inflatable core mold in the inflated state, and performing shaping; b. braiding fibers on the surface of the shaped core mold to form at least one braided layer; c. conveying the preform into a curing agent passage, and sequentially passing through a heating section and a coating section; and d. conveying the preform mixed with curing agent into a curing passage for curing and molding, then deflating and taking out the inflatable core mold. The method has a high processing automation degree and can meet large-scale produc- (Continued)

tion. The produced hollow vehicle part has good mechanical properties, low cost and remarkable lightweight effect.

15 Claims, 2 Drawing Sheets

(56) References Cited

FOREIGN PATENT DOCUMENTS

| | | | |
|---|---|---|---|
| CN | 104960211 | A | 10/2015 |
| CN | 105134849 | A | 12/2015 |
| CN | 105538737 | A | 5/2016 |
| CN | 105904742 | A | 8/2016 |
| CN | 105965982 | A | 9/2016 |
| CN | 106243631 | A | 12/2016 |
| CN | 106273559 | A | 1/2017 |
| EP | 0363744 | A2 | 4/1990 |
| EP | 2396581 | B1 | 4/2016 |
| JP | 2006218782 | A | 8/2006 |

\* cited by examiner

METHOD FOR MOLDING HOLLOW VEHICLE PART, HOLLOW VEHICLE PART AND AUTOMOBILE

CROSS-REFERENCE TO RELATED APPLICATION

The present application is a U.S. National Phase of International Patent Application Serial No. PCT/CN2017/085982 filed on May 25, 2017. The entire contents of the above-cited application are hereby incorporated by reference in their entirety for all purposes.

FIELD OF THE INVENTION

The present disclosure relates to the technical field of composite materials, and in particular, to a method for molding a hollow vehicle part, the hollow vehicle part and an automobile.

BACKGROUND OF THE INVENTION

With the increasing energy crisis and environmental crisis, vehicle lightweight has become an inevitable choice for the development of the automobile industry. A fiber reinforced composite material has the advantages of high specific strength and specific modulus, high temperature resistance, good fatigue resistance, high designability and the like, and thus has been widely used in the field of aerospace. However, due to the backward molding process and the immature structural design technology, the fiber reinforced composite material has not yet been widely used in the automobile industry. The existing fiber reinforced composite material molding methods mainly include hand lay-up molding, winding molding, pultrusion, compression molding, bag pressing molding, injection molding, and resin transfer molding (RTM) and the like. Fiber reinforced composite material products of hollow structures are generally produced by the RTM method.

In the Chinese patent CN105538737A, a hollow sandwich fabric is cut into a required shape and then is compounded with resin, then a hollow sandwich fabric prepreg is obtained by the steps of curing, winding, cutting and the like, and then the hollow sandwich fabric prepreg is placed in a mould to be heated and cured to obtain a finished product. The method can only be implemented in sections, namely each part needs to be placed in the mould to be singly cured, and the traditional molding process is employed, so that continuous production cannot be achieved.

SUMMARY OF THE INVENTION

The purpose of the present disclosure is to provide a method for molding a hollow vehicle part, the hollow vehicle part and an automobile. The method has a high automation degree and can meet the large-scale production of vehicle part. The produced hollow vehicle part has good mechanical properties, low cost and remarkable lightweight effect, being a good substitute for sheet metal parts and stamping parts.

In order to achieve the above purpose, a first aspect of the present disclosure provides a method for molding a hollow vehicle part, including the following steps:

a. preparing an inflatable core mold matching a target vehicle part on a geometrical shape in an inflated state, coating curable thermoplastic resin on the surface of the inflatable core mold in the inflated state, and performing shaping to obtain a shaped core mold;

b. braiding fibers on the surface of the shaped core mold to form at least one braided layer to obtain a preform;

c. conveying the preform into a curing agent passage, and sequentially passing through a heating section and a coating section in the curing agent passage, wherein in the heating section, the preform is preheated to melt the thermoplastic resin; and in the coating section, the molten thermoplastic resin is mixed with a curing agent to obtain a preform mixed with curing agent; and d. conveying the preform mixed with curing agent into a curing passage for curing and molding, then deflating the inflatable core mold, and taking out the inflatable core mold to obtain the hollow vehicle part.

Preferably, the material of the inflatable core mold in the step a is at least one selected from ethylene-octylene copolymer, polyetherimide, polyphenylene sulfide, polyurethane, epoxy resin and silicone rubber, and the inflatable core mold has an inflation valve.

Preferably, the resin in the step a is at least one selected from thermoplastic epoxy resin, thermoplastic polyurethane resin and thermoplastic acrylic resin.

Preferably, the fibers in the step b include a reinforced fiber and a resin fiber, and the volume ratio of the reinforced fiber to the resin fiber is 1:(0.4-2.5).

Preferably, the reinforced fiber is at least one selected from carbon fiber, ultra high molecular weight polyethylene fiber, aramid fiber, basalt fiber and glass fiber; and the resin fiber is at least one selected from thermoplastic epoxy resin fiber, thermoplastic polyurethane resin fiber and thermoplastic acrylic resin fiber.

Preferably, the braiding in the step b includes at least one of two-dimensional two-directional braiding, two-dimensional three-directional braiding, three-dimensional three-directional braiding, three-dimensional four-directional braiding and three-dimensional five-directional braiding.

Preferably, the number of braided layers in the step b is 1-30.

Preferably, the method further includes: in the step c, the preform is preheated to a temperature at which the thermoplastic resin is melted but is not cured.

Preferably, the coating section includes a curing agent groove; a first rigid netty bracket, an aqueous semipermeable membrane and a second rigid netty bracket are arranged on an inner side off the curing agent groove from outside to inside; and the curing agent is placed in the curing agent groove and is mixed with the resin and/or the fibers through the aqueous semipermeable membrane.

Preferably, the curing agent in the step c is at least one selected from blocked isocyanate curing agent, amine curing agent and polyamide curing agent.

Preferably, the curing and molding in the step d includes: inflating the inflatable core mold to achieve the curing and molding of the preform mixed with curing agent by the inflation pressure, wherein the inflation pressure of the inflatable core mold is 2-160 MPa.

Preferably, the inner diameter of the curing passage in the step d is 0.1-5 mm greater than the outer diameter of the preform mixed with curing agent.

Preferably, the method further includes the step of performing surface finishing on the hollow vehicle part after the curing and molding.

A second aspect of the present disclosure provides a hollow vehicle part prepared by the method in the first aspect of the present disclosure.

A third aspect of the present disclosure provides an automobile, including the hollow vehicle part in the second aspect of the present disclosure.

Through the above technical solutions, the molding method of the hollow vehicle part provided by the present disclosure has a high processing automation degree and rapid molding, and can realize the automatic and large-scale production of the hollow vehicle part, and the structure of the part is adjusted by changing the braiding process, the shape of the core mold and the shape of the curing passage, so that the assembly and reinforcement requirements of different vehicle models and modules to the part can be met. The hollow vehicle part prepared by the method provided by the present disclosure has good mechanical properties, low cost and remarkable lightweight effect, being a good substitute for sheet metal parts and stamping parts.

Other features and advantages of the present disclosure will be described in detail in the following detailed description of embodiments.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

DETAILED DESCRIPTION OF THE EMBODIMENTS

The specific embodiments of the present disclosure will be described in detail below in combination with the drawings. It should be understood that the specific embodiments described herein are merely used for illustrating and explaining the present disclosure, rather than limiting the present disclosure.

Figure 1:
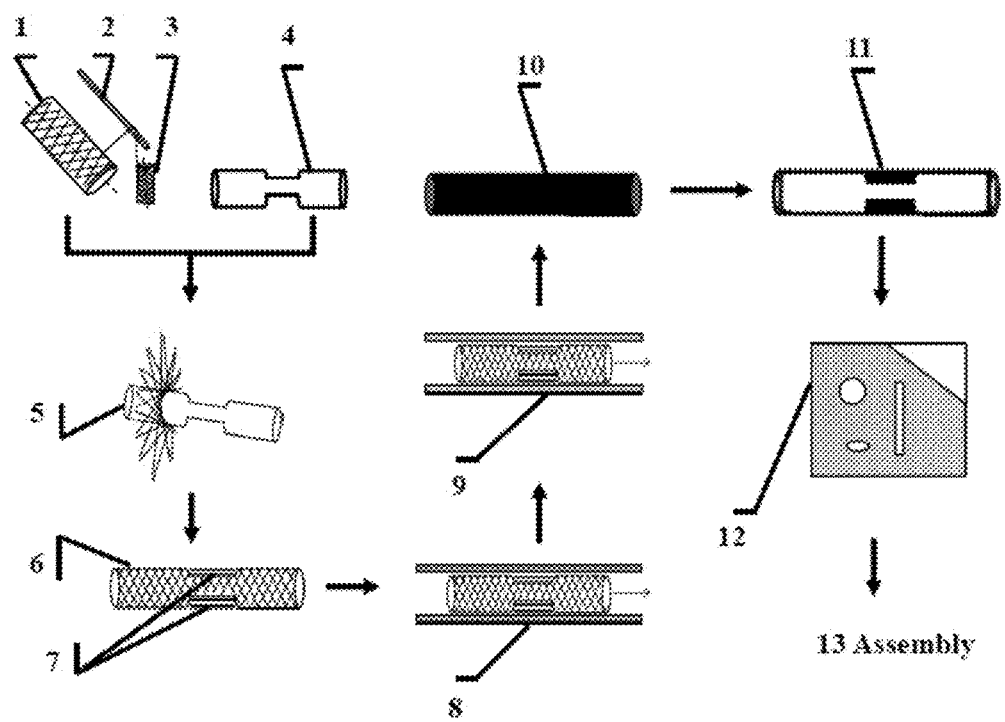
FIG. 1 is a flow diagram of a method for molding a hollow vehicle part provided by the present disclosure.

A first aspect of the present disclosure provides a method for molding a hollow vehicle part. FIG. 1 is a flow diagram of the molding method of the hollow vehicle part provided by the present disclosure, and the method includes the following steps: a. preparing an inflatable core mold 4 matching a target vehicle part on a geometrical shape in an inflated state, coating curable thermoplastic resin on the surface of the inflatable core mold 4 in the inflated state, and performing shaping to obtain a shaped core mold; b. braiding fibers on the surface of the shaped core mold to form at least one braided layer to obtain a preform 6; c. conveying the preform 6 into a curing agent passage 8, and sequentially passing through a heating section and a coating section in the curing agent passage 8, wherein in the heating section, the preform is preheated to melt the thermoplastic resin; and in the coating section, the molten thermoplastic resin is mixed with a curing agent to obtain a preform mixed with curing agent; and d. conveying the preform mixed with curing agent into a curing passage 9 for curing and molding, then deflating the inflatable core mold, and taking out the inflatable core mold to obtain the hollow vehicle part.

According to the first aspect of the present disclosure, the inflatable core mold in the step a can be made of a high-temperature resistant high-toughness elastomer. For example, the material of the inflatable core mold can be at least one selected from ethylene-octylene copolymer (POE), polyetherimide (PEI), polyphenylene sulfide (PPS), polyurethane, epoxy resin and silicone rubber. The inflatable core mold can have an inflation device, for example an inflation valve. The inflatable core mold can be made into the same shape with the inner surface structure of the target vehicle part, the inflation valve is reserved to adjust the inflation pressure at any time, and a pre-inflation pressure for inflating the inflatable core mold to a required shape can be 0.2-2 MPa.

After the inflatable core mold is inflated to obtain the required structure, and in order to avoid the deformation of subsequent step of braiding and the step of removing the core mold, the curable thermoplastic resin can be coated on the surface of the core mold to form a film so as to further fix the structure. The resin in the step a can be at least one selected from thermoplastic epoxy resin, thermoplastic polyurethane resin and thermoplastic acrylic resin. The thermoplastic resin can form a layer of resin film at a normal temperature to achieve a shaping effect on the inflatable core mold. In addition to fixing the shape of the inflatable core mold, the thermoplastic resin is employed in the step to improve the appearance of the part in subsequent procedures.

According to the first aspect of the present disclosure, the braiding step in the step b can be carried out by using a braiding machine, and is preferably carried out by using a multi-dimensional multi-way braiding machine. The operation method of the braiding machine is well known to those skilled in the art, and generally includes a step of winding large ingot fibers 1 into small ingot fibers 3 matching the braiding equipment by using a fiber guide frame 2 and mounting the small ingot fibers on a yarn position of the braiding machine prior to the braiding as shown in FIG. 1, and thus is not repeated in the present disclosure. After the shaped core mold is assembled on a core mold position of the braiding machine, braiding 5 is carried out on the surface of the shaped core mold. The braiding is preferably multi-dimensional multi-directional braiding. For example, the braiding can include at least one of two-dimensional two-directional braiding, two-dimensional three-directional braiding, three-dimensional three-directional braiding, three-dimensional four-directional braiding and three-dimensional five-directional braiding. The multi-dimensional multi-directional braiding method belongs to a relatively common method in the fiber braiding industry, and the specific process can be easily known by those skilled in the art, so that no more details are described in the present disclosure. The number of braided layers can be 1-30. The method provided by the present disclosure can be used for producing a hollow vehicle part having a reinforcement region. For example, as shown in FIG. 1, when the structure of the vehicle part is of dumbbell shape with a reinforcement region 7 at the middle, the number of braided layers can be adjusted in the reinforcement region to achieve local reinforcement so as to meet different requirements of different modules on the performance of the part. For the vehicle part, it is preferred that the number of braided layers is 2-10 and the number of braided layers in the reinforcement region is 20-30 or more, as long as the outer surfaces of the braided layers in the reinforcement region are flush with other regions. The method provided by the first aspect of the present disclosure adopts the multi-dimensional multi-directional braiding method to perform the braiding on the surface of the inflatable core mold, so that the vehicle part can be reinforced on multiple directions; meanwhile, by changing the number of braided layers, the local strength can be improved to meet the assembly and reinforcement requirements of different vehicle parts. The premolding is realized by in a braiding manner, and one-step molding from the fiber to the preform is realized. The complicated procedures such as fabric braiding, pre-dipping, paving, molding and the like in the traditional method are reduced, and the processing efficiency and the consistency can be effectively improved.

According to the first aspect of the present disclosure, the fibers in the step b can include a reinforced fiber and a resin fiber, and the volume ratio of the reinforced fiber to the resin fiber can be 1:(0.4-2.5), preferably 1:(0.6-1.5). The type of the reinforced fiber is not particularly limited and can be a common reinforced fiber type in the field of composite materials. For example, the reinforced fiber can be at least one selected from carbon fiber, ultra high molecular weight polyethylene fiber, aramid fiber, basalt fiber and glass fiber. The above type of reinforced fiber has high strength, good stitchability, and good compatibility with the resin fiber. The resin fiber can be common thermoplastic resin fiber in the field of composite materials. For example, the resin fiber can be at least one selected from thermoplastic epoxy resin fiber, thermoplastic polyurethane resin fiber and thermoplastic acrylic resin fiber. The resin fiber is braided into a fiber shape by the thermoplastic resin without curing agent in a melt spinning manner and is placed on the yarn position of the braiding machine together with the reinforced fiber. The resin fiber and reinforced fiber can be alternately arranged on the braiding machine to ensure the uniform distribution of different yarns in the fabric. The resin fiber can be the same thermoplastic resin as the curable thermoplastic resin in the step a, and can also be different thermoplastic resin having similar properties. Thermoplastic resin same as the curable thermoplastic resin is preferably employed as the resin fiber.

Figure 2:
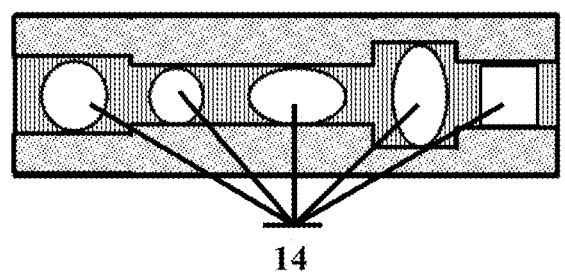
FIG. 2 is a side view of a curing agent passage in the molding method of the hollow vehicle part provided by the present disclosure.
Figure 3:
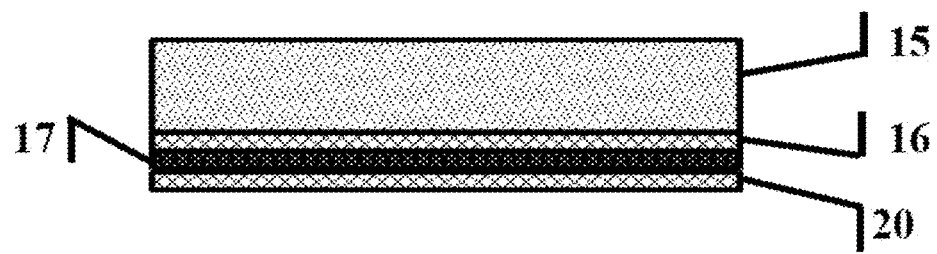
FIG. 3 is a structural schematic diagram of a coating section of the curing agent passage in the molding method of the hollow vehicle part provided by the present disclosure.

According to the first aspect of the present disclosure, the purpose of conveying the preform into the curing agent ramp is to generate curing crosslinking by mixing the curing agent with the curable thermoplastic resin in the step a and/or the resin fiber in the step b, so that the thermoplastic resin and/or the resin fiber becomes a thermosetting resin system with good stability and high strength after being molded. It is conducive to improving the overall strength of the vehicle part to convey the preform into the curing agent ramp, as well as solving the problem of poor fatigue resistance and aging resistance of the vehicle part produced by using the thermoplastic resin. In order to more homogeneously mix the curing agent with the curable thermoplastic resin in the step a and/or the resin fiber in the step b, the curing agent passage can include a heating section and a coating section. The preheating of the preform can be completed in the heating section, and the preform is preheated until the thermoplastic resin melts in the heating section. In order to better mix the resin fiber and/or the thermoplastic resin on the surface of the inflatable core mold with the curing agent without further curing, the temperature of the heating section can be 1-20° C. lower than the melting point of the thermoplastic resin, preferably 2-10° C. lower than the melting point of the thermoplastic resin. When the model number of the resin fiber is different from that of the thermoplastic resin on the surface of the inflatable core mold, the temperature of the heating section can mainly refer to the melting point data of the resin fiber. In the step c, the preform is preheated to a temperature at which the thermoplastic resin is melted but is not cured. By means of the preheating, the resin fiber and/or the thermoplastic resin on the surface of the inflatable core mold can be softened to a slightly melted state, so as to be better mixed with the curing agent in the coating section without curing. In the coating section, the molten thermoplastic resin is mixed with the curing agent, the implementation manner of the coating section is any manner that is capable of implementing the adding of the curing agent to meet the mixing requirements of the curing agent and the molten thermoplastic resin. In order to better mix the curing agent with the curable thermoplastic resin in the step a and/or the resin fiber in the step b, in a preferred embodiment, the coating section can include a curing agent groove 15. A first rigid netty bracket 16, an aqueous semipermeable membrane 17 and a second rigid netty bracket 20 are arranged on an inner side of the curing agent groove 15 from outside to inside, as shown in FIG. 3. The inside and outside are with respect to the structure of the curing agent passage. The curing agent is placed in the curing agent groove and is mixed with the curable thermoplastic resin and/or the resin fiber through the aqueous semipermeable membrane. The rigid netty structures on the upper and lower surfaces of the aqueous semipermeable membrane can be made to protect the semipermeable membrane from being broken or detached. The curing agent can be a curing agent of conventional thermoplastic resin. In the above preferred embodiment, the curing agent can be an aqueous curing agent of the thermoplastic resin. For example, the curing agent in the step c can be at least one selected from blocked isocyanate curing agent, amine curing agent and polyamide curing agent. The above aqueous curing agent can freely pass through the aqueous semipermeable membrane to infiltrate the surface of the preform so as to be primarily mixed with the thermoplastic resin more uniformly. The shape of the curing agent passage can be varied within a wide range. For example, the cross section 14 of the curing agent passage can be circular, elliptical, square or the like, and can be made into a plurality of specifications according to the size of the part, so as to meet shape and size requirements of different parts, as shown in FIG. 2. The lengths of the heating section and the coating section can be designed according to the actual needs, and the time for the preform to pass through the heating section and the coating section can also be adjusted according to the actual needs.

Figure 4:
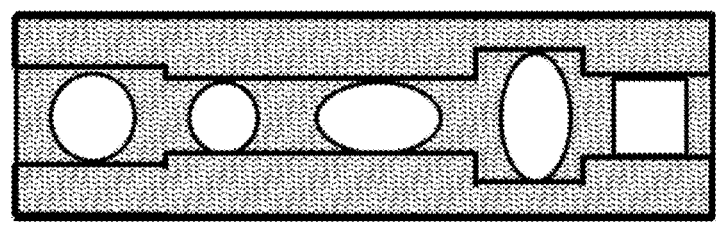
FIG. 4 is a side view of a curing passage in the molding method of the hollow vehicle part provided by the present disclosure.
Figure 5:
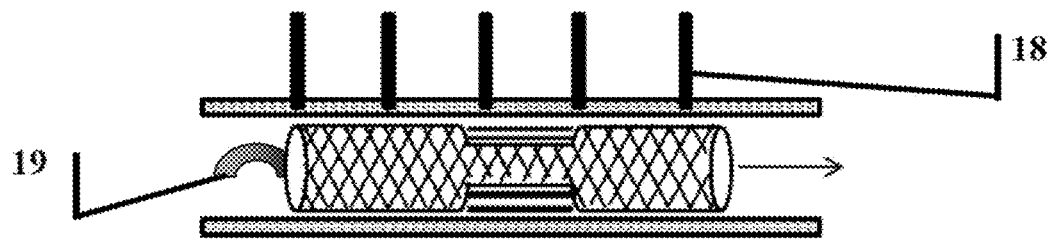
FIG. 5 is a schematic diagram of the curing passage in the molding method of the hollow vehicle part provided by the present disclosure.

According to the first aspect of the present invention, the preform mixed with curing agent is conveyed into the curing passage for curing and molding. In a curing process, the thermoplastic resin in the step a and the resin fiber in the step b are melted and thoroughly mixed with the curing agent, filled on the surface of the reinforced fiber, and complete the curing and molding at a suitable curing temperature. The inner diameter of the curing passage can be 0.1-5 mm greater than the outer diameter of the preform mixed with curing agent, to ensure that the cured resin layer is not too thick to affect the performance and the weight of the part. Chromate finish can be performed on the inner surface of the curing passage to prevent the resin from being adhered to the passage, so that the performance of the part wont't be affected. The curing passage can be heated in sections by using a sectioned heating device 18, as shown in FIG. 5. The specific temperature can be adjusted according to the curing process requirements of the resin to form a suitable temperature field. The curing temperature fields of different resins are different, and no more introduction is given in the present disclosure. The shape of the curing passage can be varied within a wide range, for example circular, elliptical, square or the like. And the curing passage can be made into a plurality of specifications according to the size of the part to meet different part shape and size requirements, as shown in FIG. 4. The length of the curing passage can be 2-3 meters to ensure that the stroke of the preform in the passage does not fluctuate. In order to ensure the curing time, if the overall length of the passage needs to be prolonged to ensure the sufficient curing, the number of the curing passages can be increased. The number of the curing passages is preferably 1-7, and the adjacent passages are connected by heat preservation passages to ensure the stability of the temperature field. Due to the use of multiple sections of passages, the flexibility of the curing process can also be improved, to meet the curing requirements of different resins.

In the curing and molding process, the core mold can be further inflated by an inflation pressurization pipeline 19, as shown in FIG. 5. The resin on the surface of the fiber is further compressed by an internal pressure to improve the bonding effect between the resin and the reinforced fiber, reduce the porosity between the resins and improve the mechanical properties of composite material part. Therefore, the curing and molding in the step d can further include: inflating the inflation core mold to achieve the curing and molding of the preform mixed with curing agent by the inflation pressure, wherein the inflation pressure of the inflation core mold is 2-160 MPa, and preferably 10-80 MPa.

After the curing and molding, the part 10 having the core mold is obtained by leaving the curing passage, and then the inflatable core mold is deflated and taken out to obtain the part 11 without the core mold. Thereafter, according to the part assembly requirements, the method can further include the step of performing surface finishing 12 on the hollow vehicle part after the curing and molding. The surface finishing can include conventional processing means in the art required for cutting, perforating, surface treatment and the like. Finally the prepared hollow vehicle part can be assembly on an automobile body by assembly 13. The removed core mold can be re-inflated and reused. Different sizes of parts can be processed with different core molds and passages and are connected together by gluing, riveting, and clamping after being molded to achieve modular production. The multiple sections of core molds are connected for use to meet the continuous online production requirements.

By adoption of the method provided by the first aspect of the present disclosure, online completion of the curing and molding process is completed. The curing and molding is completed under a motion state, so that the time of mold opening, mold closing and the waiting are shortened. The one-time processing of ultra-long parts can be achieved. The subsequent bonding number is reduced, and the overall strength and the consistency of the parts are improved. The method has the advantages of high processing automation degree, fast molding and capable of realizing automatic and large-scale production of the hollow vehicle part. The structure of the part is adjusted by changing the braiding process, the shape of the core mold and the shape of the curing passage, so that the assembly and reinforcement requirements of different vehicle models and locations can be met. Meanwhile, by adoption of the method provided by the first aspect of the present disclosure, fixed-size vehicle parts can be produced, which is conducive to improving the modular integration of various vehicle models, improving the versatility of vehicle parts and reducing the development cycle and cost.

A second aspect of the present disclosure provides a hollow vehicle part prepared by the method in the first aspect of the present disclosure.

The hollow vehicle part provided by the second aspect of the present disclosure has good mechanical properties, low cost and remarkable lightweight effect, being a good substitute for sheet metal parts and stamping parts.

A third aspect of the present disclosure provides an automobile, including the hollow vehicle part in the second aspect of the present disclosure.

The present disclosure is further illustrated by the following embodiments, but the contents of the present invention are not limited thereto.

Embodiment 1

Figure 6:
FIG. 6 is a structural schematic diagram of a hollow vehicle part provided by the present disclosure.

The present embodiment is used for explaining the molding method of the hollow vehicle part of the present disclosure. The shape of the hollow vehicle part is as shown in FIG. 6, and the shape of the inflatable core mold is as shown by a reference sign 4 in FIG. 1 (the inflation valve is not shown). In the present embodiment, the inflatable core mold is made of polyphenylene sulfide (PPS, purchased from the GE Corporation), and the pre-inflation pressure is 0.2 MPa. The surface of the inflatable core mold is coated with epoxy resin (purchased from the Huntsman Corporation with a shop sign of LY 1564) for shaping. Carbon fibers (purchased from the Toray Corporation with a shop sign of T300) and epoxy fibers (purchased from the Huntsman Corporation with a shop sign of 1564) are alternately arranged on the braiding machine. The volume ratio of the carbon fibers to the epoxy fibers is 1:1.5, and the fibers are braided onto the surface of the core mold on a 3D surface braiding machine of the SPIRALTEX Corporation through a three-dimensional five-way braiding method to obtain the preform. The number of braided layers in a normal region of the preform is 3, and the number of braided layers in the reinforcement region 7 is 12.

The preform is conveyed into the curing agent passage. The temperature of the heating section is set as 95° C., and the time of the preform to pass through the heating section is 3 minutes. The curing agent is a blocked isocyanate aqueous curing agent (purchased from the Hefei Adiya Chemical Co., Ltd with a shop sign of Y-2016).

The preform mixed with curing agent are continuously conveyed through 5 sections of curing passages. The length of each section of curing passage is 3 m, and the inner diameter is 5 mm greater than the outer diameter of the preform mixed with curing agent. The curing temperatures are respectively 115° C., 125° C., 135° C., 140° C. and 130° C. The inflatable core mold is inflated, and the inflation pressure is 60 MPa. The time of the preform mixed with curing agent to pass through the 5 sections of curing passages is 5 min.

After the temperature is lowered to the room temperature, the core mold is deflated and taken out, and the hollow vehicle part of the present embodiment is obtained by performing cutting, punching and surface treatment on the molded part.

Embodiment 2

The present embodiment is used for explaining the molding method of the hollow vehicle part of the present disclosure, the same molding method as that of the Embodiment 1 is employed, except that the number of braided layers in the common region is 5, and the number of braided layers in the reinforcement region is 10.

Embodiment 3

The present embodiment is used for explaining the molding method of the hollow vehicle part of the present disclosure, the same molding method as that of the Embodiment 1 is employed, except that the volume ratio of the carbon fibers to the epoxy resin fibers is 1:0.6.

Embodiment 4

The present embodiment is used for explaining the molding method of the hollow vehicle part of the present disclosure, the same molding method as that of the Embodiment 1 is employed, except that the volume ratio of the carbon fibers to the epoxy resin fibers is 1:2.5.

Embodiment 5

The present embodiment is used for explaining the molding method of the hollow vehicle part of the present disclosure, the same molding method as that of the Embodiment 1 is employed, except that the volume ratio of the carbon fibers to the epoxy resin fibers is 1:0.4.

Comparative Embodiment 1

The present comparative embodiment is used for explaining the molding method of the hollow vehicle part of the present disclosure, and the shape of the hollow vehicle part is as shown in FIG. 6.

The hollow vehicle part in the present comparative embodiment is obtained by high-strength steel stamping and welding methods.

Test Embodiment 1

The weight and the yield strength of the hollow vehicle parts obtained in the Embodiments 1-5 and the comparative embodiment 1 are respectively tested. The test method of the yield strength refers to GB/T228-2002, the specific strength is defined as a ratio of the yield strength to the weight, and the test results are shown in Table 1.

TABLE 1

|  | Weight/kg | Yield strength/MPa | Specific strength/ (MPa · kg$^{-1}$) |
|---|---|---|---|
| Embodiment 1 | 1.2 | 1400 | 1167 |
| Embodiment 2 | 1.4 | 1450 | 1036 |
| Embodiment 3 | 1.31 | 1840 | 1404 |
| Embodiment 4 | 1.15 | 911 | 792 |
| Embodiment 5 | 1.36 | 1331 | 979 |
| Comparative embodiment 1 | 2.2 | 1250 | 568 |

It can be seen from the comparison data of the Embodiment 1 and the Comparative embodiment 1 that, compared with the part made of a metal material, the specific strength of the hollow vehicle part prepared by the molding method of the present disclosure is significantly improved. It can be seen from the comparison data of the Embodiment 1 and the Embodiment 2 that, the strength of the parts obtained of different number of braided layers is equivalent, but the specific strength of the locally reinforced part (Embodiment 1) is significantly better than the integrally reinforced part (Embodiment 2). It can be seen from the comparison data of the Embodiment 1 and the Embodiment 3 that, within a certain proportional range, the specific strength of the part can be significantly improved by improving the proportion of the reinforced fiber. And it can be seen from the comparison data of the Embodiments 1-3 and the Embodiments 4-5 that, when the volume ratio of the reinforce fiber to the resin fiber is 1:(0.6-1.5), the prepared part can obtain higher specific strength.

The preferred embodiments of the present disclosure have been described in detail above in combination with the drawings, however, the present disclosure is not limited to the specific details in the above embodiments. Various simple modifications can be made to the technical solutions of the present disclosure within the scope of the technical idea of the present disclosure, and these simple modifications are all within the protection scope of the present disclosure.

It should be additionally noted that, various specific technical features described in the above specific embodiments can be combined in any suitable manner without contradiction. In order to avoid unnecessary repetition, various possible combination modes are not additionally illustrated in the present disclosure.

In addition, arbitrary combinations can be made to various different embodiments of the present disclosure, and as long as not deviating from the idea of the present disclosure, they should also be regarded as the contents disclosed by the present disclosure.

The invention claimed is:
1. A method for molding a hollow vehicle part, comprising the following steps:
   a. preparing an inflatable core mold matching a target vehicle part on a geometrical shape in an inflated state, coating curable thermoplastic resin on the surface of the inflatable core mold in the inflated state, and performing shaping to obtain a shaped core mold;
   b. braiding fibers on the surface of the shaped core mold to form at least one braided layer to obtain a preform;
   c. conveying the preform into a curing agent passage, and sequentially passing through a heating section and a coating section in the curing agent passage, wherein in the heating section, the preform is preheated to melt the thermoplastic resin; and in the coating section, the molten thermoplastic resin is mixed with a curing agent to obtain a preform mixed with curing agent; and
   d. conveying the preform mixed with curing agent into a curing passage for curing and molding, then deflating the inflatable core mold, and taking out the inflatable core mold to obtain the hollow vehicle part.

2. The method according to claim 1, wherein the material of the inflatable core mold in the step a is at least one selected from ethylene-octylene copolymer, polyetherimide, polyphenylene sulfide, polyurethane, epoxy resin and silicone rubber, and the inflatable core mold has an inflation valve.

3. The method according to claim 1, wherein the resin in the step a is at least one selected from thermoplastic epoxy resin, thermoplastic polyurethane resin and thermoplastic acrylic resin.

4. The method according to claim 1, wherein the fibers in the step b comprise a reinforced fiber and a resin fiber, and the volume ratio of the reinforced fiber to the resin fiber is 1:(0.4-2.5).

5. The method according to claim 4, wherein the reinforced fiber is at least one selected from carbon fiber, ultra high molecular weight polyethylene fiber, aramid fiber, basalt fiber and glass fiber; and the resin fiber is at least one selected from thermoplastic epoxy resin fiber, thermoplastic polyurethane resin fiber and thermoplastic acrylic resin fiber.

6. The method according to claim 1, wherein the braiding in the step b comprises at least one of two-dimensional two-directional braiding, two-dimensional three-directional braiding, three-dimensional three-directional braiding, three-dimensional four-directional braiding and three-dimensional five-directional braiding.

7. The method according to claim 1, wherein the number of braided layers in the step b is 1-30.

8. The method according to claim 1, wherein the method further comprises: in the step c, the preform is preheated to a temperature at which the thermoplastic resin is melted but is not cured.

9. The method according to claim 8, wherein the coating section comprises a curing agent groove; a first rigid netty bracket, an aqueous semipermeable membrane and a second rigid netty bracket are arranged on an inner side off the curing agent groove from outside to inside; and the curing agent is placed in the curing agent groove and is mixed with the resin and/or the fibers through the aqueous semipermeable membrane.

10. The method according to claim 1, wherein the curing agent in the step c is at least one selected from blocked isocyanate curing agent, amine curing agent and polyamide curing agent.

11. The method according to claim 1, wherein the curing and molding in the step d comprises: inflating the inflatable core mold to achieve the curing and molding of the preform mixed with curing agent by the inflation pressure, wherein the inflation pressure of the inflatable core mold is 2-160 MPa.

12. The method according to claim 11, wherein the inner diameter of the curing passage in the step d is 0.1-5 mm greater than the outer diameter of the preform mixed with curing agent.

13. The method according to claim 1, wherein the method further comprises the step of performing surface finishing on the hollow vehicle part after the curing and molding.

14. A hollow vehicle part prepared by a method comprising the following steps:
 a. preparing an inflatable core mold matching a target vehicle part on a geometrical shape in an inflated state, coating curable thermoplastic resin on the surface of the inflatable core mold in the inflated state, and performing shaping to obtain a shaped core mold;
 b. braiding fibers on the surface of the shaped core mold to form at least one braided layer to obtain a perform;
 c. conveying the preform into a curing agent passage, and sequentially passing through a heating section and a coating section in the curing agent passage, wherein the heating section, the preform is preheated to melt the thermoplastic resin; and in the coating section, the molten thermoplastic resin is missed with a curing agent to obtain a preform mixed with curing agent; and
 d. conveying the preform mixed with a curing agent into a curing passage for curing and molding, then deflating the inflatable core mold, and taking out the inflatable core mold to obtain the hollow vehicle part.

15. An automobile, comprising hollow vehicle part, which is prepared by a method comprising the following steps:
 a. preparing an inflatable core mold matching a target vehicle part on a geometrical shape in an inflated state, coating curable thermoplastic resin on the surface of the inflatable core mold in the inflated state, and performing shaping to obtain a shaped core mold;
 b. braiding fibers on the surface of the shaped core mold to form at least one braided layer to obtain a perform;
 c. conveying the preform into a curing agent passage, and sequentially passing through a heating section and a coating section in the curing agent passage, wherein the heating section, the preform is preheated to melt the thermoplastic resin; and in the coating section, the molten thermoplastic resin is missed with a curing agent to obtain a preform mixed with curing agent; and
 d. conveying the preform mixed with a curing agent into a curing passage for curing and molding, then deflating the inflatable core mold, and taking out the inflatable core mold to obtain the hollow vehicle part.

\* \* \* \* \*